J. KRAFT.
Stalk-Cutter.
No. 216,684. Patented June 17, 1879.
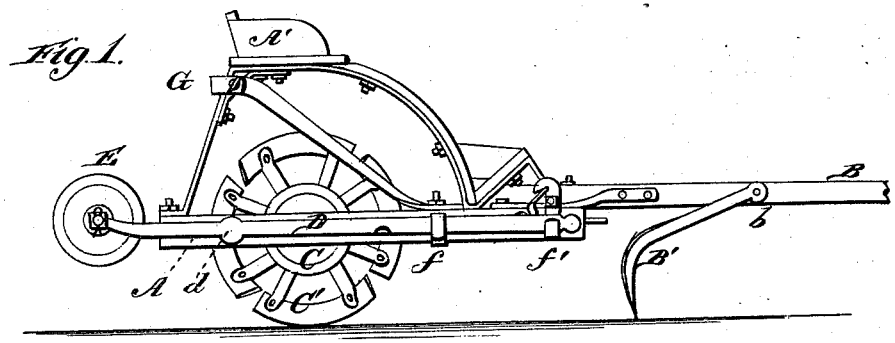
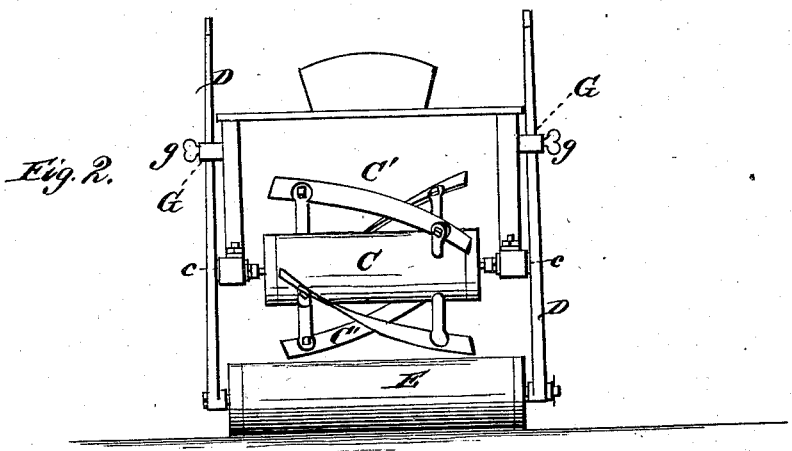
WITNESSES
Robert Everett
N. Clay Smith
By
INVENTOR
Jacob Kraft.
Gilmore Smith & Co.
ATTORNEYS

UNITED STATES PATENT OFFICE.

JACOB KRAFT, OF DOWNEY, CALIFORNIA.

IMPROVEMENT IN STALK-CUTTERS.

Specification forming part of Letters Patent No. 216,684, dated June 17, 1879; application filed March 29, 1879.

*To all whom it may concern:*

Be it known that I, JACOB KRAFT, of Downey, in the county of Los Angeles and State of California, have invented certain new and useful Improvements in Stalk-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my stalk-cutter, and Fig. 2 is a rear view of the same.

My invention relates to a device for cutting stalks in the field for the purpose of plowing them under; and the novelty consists in the construction and arrangement of parts, as will be more fully hereinafter set forth.

In carrying out my invention I employ a body-frame having draft-pole and driver's seat, these parts being properly braced in any suitable manner. Hooks are provided to properly align the stalks and bring them in the track of a roller journaled in the frame, and having spiral cutting-knives, which sink into the earth to the face of the roller. Pivoted to the frame are two levers, in which is journaled a roller, which, when the levers are horizontal, follows the knife-roller, steadies the machine, and buries or presses into the earth the cut pieces of stalk. When the levers are secured vertically it operates as a riding or running gear to transport the device from place to place.

Suitable securing devices are provided, by which the levers are secured vertically or horizontally, as the roller is used as a follower or transporting means.

Referring to the drawings, A represents the body-frame, having ordinary seat A' and pole B, to which is loosely pivoted, at $b$, the hooks B', as shown. Journaled in the body-frame A, at $c$, is a roller, C, carrying rigid spiral knives C'. Pivoted to the said frame at $d$, upon each side, are levers D, carrying a roller, E, as shown. These levers are adapted to operate horizontally, being secured in that position by hooks $f$ and pivoted hooks $f'$ and a proper lock-catch, and to operate vertically, being secured in that position by hook G and set-screw $g$.

When in operation the levers D are secured horizontally, the hooks B' align the stalks, the knives cut them, and the roller E presses them into the earth.

In taking the machine from place to place the levers D are secured vertically, and the machine rides on the roller E, as shown.

I claim—

In a stalk-chopper, the combination, with the frame A, having the pole B and hooks B', of the roller C, having the knives C', and the roller E and levers D D, hooks $f f'$, and catch and hook G and set-screws $g$, as and for the purposes set forth.

In testimony that I claim the above I have hereunto subscribed my name in the presence of two witnesses.

JACOB KRAFT.

Witnesses:
P. WHEELER,
M. JONSON.